UNITED STATES PATENT OFFICE.

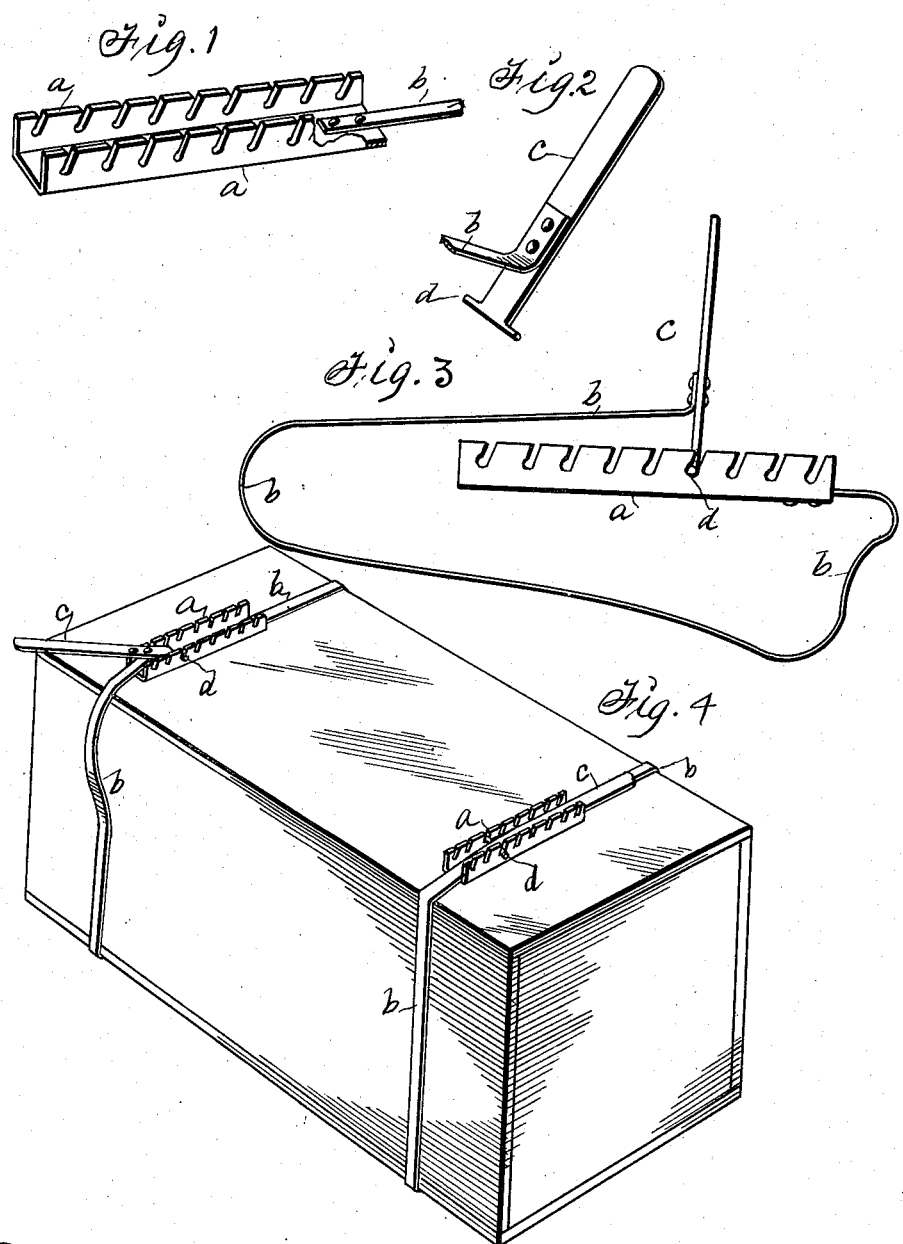

JOHN S. MARK, OF ADEL, IOWA.

BAND AND FASTENER COMBINED.

No. 867,518.   Specification of Letters Patent.   Patented Oct. 1, 1907.

Application filed May 23, 1907. Serial No. 375,368.

*To all whom it may concern:*

Be it known that I, JOHN S. MARK, a citizen of the United States, residing at Adel, in the county of Dallas and State of Iowa, have invented a new and useful Band and Fastener Combined, of which the following is a specification.

My object is to provide a metal band and fastener combined and adapted to be manually and advantageously, adjustably and detachably placed around a bale or box without fastening any portion thereof to the object that it surrounds and its ends securely fastened together in overlying position without any extraneous fastening device or the use of any kind of a tool as required for binding separable objects together securely.

My invention consists in the construction, application and operation of the device hereinafter set forth, pointed out in my claims and illustrated in the accompanying drawings in which—

Figure 1 is a perspective view of the duplex rack and Fig. 2 of the lever. Fig. 3 shows the rack the lever and a band combined as required to produce a complete article for practical use. Fig. 4 is a perspective view of a square box and two bands around it. The lever connected with one of the bands is in position as required for tightening the band on the box and the other lever on the other band is in a locked position.

The letter $a$ designates the duplex rack. It is made of metal complete in one piece, preferably by means of dies, and may vary in size and weight as desired. A flexible band $b$, preferably strap iron, is fixed in one end by means of rivets, or in any suitable way. A rigid lever $c$, preferably flat, having a cross head $d$ at its lower end, is fixed to the free end of the band $b$ by means of rivets or in any suitable way at some distance above the cross head $d$, as required for use in drawing the band tight around an object and then locking it in the duplex rack as shown in Fig. 4.

In the practical use of my invention it is only necessary to place the band around the box to be bound therewith, place the rack against the object, connect the lever with the rack and then press it into the rack as shown.

Having thus set forth the purpose of my invention and its construction and manner of use the advantages and practical utility thereof will be obvious.

What I claim as new and desire to secure by Letters-Patent, is:

1. A band and fastener combined composed of a flexible band, a duplex rack fixed to one end of the band and a lever having a cross head at its lower end to engage the rack and operate as set forth.

2. A band and fastener comprising a flexible band, a duplex rack and a lever having a cross head at its end, in combination with a box or the like as set forth.

JOHN S. MARK.

Witnesses:
S. L. WARD,
CHAS. R. SASSAMAN.